US009754701B2

(12) United States Patent
Turpin et al.

(10) Patent No.: US 9,754,701 B2
(45) Date of Patent: Sep. 5, 2017

(54) ELECTRICAL INSULATION MATERIAL

(71) Applicant: 3M INNOVATIVE PROPERTIES COMPANY, St. Paul, MN (US)

(72) Inventors: Robert H. Turpin, Tilton, NH (US); David S. Stankes, New Hampton, NH (US); Martin H. Fox, Wiscasset, ME (US); Mitchell T. Huang, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 157 days.

(21) Appl. No.: 14/406,044

(22) PCT Filed: Mar. 11, 2013

(86) PCT No.: PCT/US2013/030200
§ 371 (c)(1),
(2) Date: Dec. 5, 2014

(87) PCT Pub. No.: WO2013/187956
PCT Pub. Date: Dec. 19, 2013

(65) Prior Publication Data
US 2015/0118464 A1    Apr. 30, 2015

Related U.S. Application Data

(60) Provisional application No. 61/660,210, filed on Jun. 15, 2012.

(51) Int. Cl.
*H01B 3/50* (2006.01)
*H01B 17/60* (2006.01)
*D04H 1/4209* (2012.01)
*D04H 1/4342* (2012.01)
*D04H 1/4374* (2012.01)
*H01B 3/52* (2006.01)
*B32B 5/26* (2006.01)
*B32B 5/02* (2006.01)
*B32B 5/08* (2006.01)
*B32B 7/02* (2006.01)
*B32B 27/10* (2006.01)
*B32B 29/02* (2006.01)
*H01B 3/30* (2006.01)
*H01B 3/42* (2006.01)
(Continued)

(52) U.S. Cl.
CPC ............. *H01B 3/50* (2013.01); *B32B 5/022* (2013.01); *B32B 5/08* (2013.01); *B32B 5/26* (2013.01); *B32B 7/02* (2013.01); *B32B 7/12* (2013.01); *B32B 27/10* (2013.01); *B32B 29/02* (2013.01); *D04H 1/4209* (2013.01); *D04H 1/4342* (2013.01); *D04H 1/4374* (2013.01); *H01B 3/301* (2013.01); *H01B 3/305* (2013.01); *H01B 3/425* (2013.01); *H01B 3/52* (2013.01); *H01B 17/60* (2013.01); *B32B 37/12* (2013.01); *B32B 2250/03* (2013.01); *B32B 2250/04* (2013.01); *B32B 2250/05* (2013.01); *B32B 2250/40* (2013.01); *B32B 2250/42* (2013.01); *B32B 2262/0269* (2013.01); *B32B 2262/0284* (2013.01); *B32B 2305/22* (2013.01); *B32B 2305/28* (2013.01); *B32B 2307/206* (2013.01); *B32B 2307/3065* (2013.01); *B32B 2317/12* (2013.01); *B32B 2367/00* (2013.01); *B32B 2377/00* (2013.01); *B32B 2457/04* (2013.01); *Y10T 428/2495* (2015.01); *Y10T 428/24942* (2015.01); *Y10T 428/24992* (2015.01); *Y10T 442/659* (2015.04); *Y10T 442/693* (2015.04)

(58) Field of Classification Search
CPC .......... H01B 3/50; H01B 3/301; H01B 3/425; H01B 3/305; H01B 3/52; H01B 17/60; B32B 7/12; B32B 7/02; B32B 5/08; B32B 27/10; B32B 29/02; B32B 5/022; B32B 5/26; B32B 2262/0284; B32B 2250/04; B32B 2262/0269; B32B 2305/22; B32B 2367/00; B32B 2250/40; B32B 2250/05; B32B 2377/00; B32B 2457/04; B32B 2307/3065; B32B 2307/206; B32B 2250/42; B32B 2250/03; D04H 1/4374; D04H 1/4209; D04H 1/4342; Y10T 442/659; Y10T 442/693; Y10T 428/24942; Y10T 428/2495; Y10T 428/24992
USPC .................. 428/212, 213, 218; 442/381, 412
See application file for complete search history.

(56) References Cited

U.S. PATENT DOCUMENTS 3,309,260 A   3/1967   Boese
3,523,061 A   8/1970   Purvis et al.
3,686,062 A   8/1972   Romanin
(Continued)

FOREIGN PATENT DOCUMENTS

CA   2003221   5/1990
EP   0122967   10/1987
(Continued)

OTHER PUBLICATIONS

IPT Technical Reference Guide, Innovative Paper Technologies, LLC, URL <www.iptllc.net/insulation/IPTTechRefGuide.pdf>.
(Continued)

*Primary Examiner* — Nathan Van Sell
(74) *Attorney, Agent, or Firm* — Janet A. Kling

(57) ABSTRACT

Provided is an article containing non-cellulosic nonwoven fabric layer between two non-cellulosic nonwoven paper layers wherein one or both of the nonwoven paper and nonwoven fabric are electrically insulating. At least some embodiments are flame retardant.

10 Claims, No Drawings

(51) Int. Cl.
*B32B 7/12* (2006.01)
*B32B 37/12* (2006.01)

(56) References Cited

U.S. PATENT DOCUMENTS

| | | | |
|---|---|---|---|
| 3,814,622 | A | 6/1974 | Isshiki et al. |
| 4,096,313 | A | 6/1978 | Fujita et al. |
| 4,259,398 | A | 3/1981 | Seino et al. |
| 4,273,825 | A | 6/1981 | Nishiyama et al. |
| 4,726,987 | A | 2/1988 | Trask et al. |
| 5,246,772 | A | 9/1993 | Manning |
| 5,478,640 | A | 12/1995 | Berbner et al. |
| 5,622,775 | A | 4/1997 | Burks, Jr. et al. |
| 5,721,397 | A | 2/1998 | Weinberg |
| 5,723,020 | A | 3/1998 | Robinson |
| 6,312,561 | B1 | 11/2001 | Forsten et al. |
| 6,443,257 | B1 | 9/2002 | Wiker |
| 6,855,404 | B2 | 2/2005 | Anderson et al. |
| 7,335,275 | B2 | 2/2008 | Anderson et al. |
| 7,459,407 | B2 | 12/2008 | Lorentz |
| 7,927,461 | B2 | 4/2011 | Yokura et al. |
| 2003/0200656 | A1 | 10/2003 | Wilson |
| 2004/0115422 | A1 | 6/2004 | Levit et al. |
| 2005/0274472 | A1 | 12/2005 | Steif |
| 2006/0003659 | A1 | 1/2006 | Kawka et al. |
| 2006/0019081 | A1* | 1/2006 | Levit .................. B32B 7/02 428/292.1 |
| 2006/0225952 | A1* | 10/2006 | Takayasu ............ G10K 11/162 181/294 |
| 2007/0011693 | A1 | 1/2007 | Creasy, Jr. |
| 2007/0087178 | A1 | 4/2007 | Hendriks et al. |
| 2008/0064279 | A1 | 3/2008 | Browning et al. |
| 2008/0145600 | A1 | 6/2008 | Hendren |
| 2008/0286591 | A1 | 11/2008 | Hollberg et al. |
| 2009/0029885 | A1 | 1/2009 | Conley et al. |
| 2010/0147555 | A1 | 6/2010 | Laura, Jr. et al. |
| 2010/0323179 | A1 | 12/2010 | Kim et al. |
| 2011/0130497 | A1 | 6/2011 | Su et al. |
| 2012/0085567 | A1* | 4/2012 | Lintz .................. H01B 3/44 174/110 SR |
| 2012/0111627 | A1 | 5/2012 | Kato et al. |
| 2012/0156956 | A1 | 6/2012 | Turpin et al. |

FOREIGN PATENT DOCUMENTS

| | | |
|---|---|---|
| EP | 0 468 471 A2 | 1/1992 |
| GB | 1544044 | 4/1979 |
| JP | 56159015 | 12/1981 |
| JP | 57138718 | 8/1982 |
| JP | 62035841 | 2/1987 |
| JP | H07-032549 | 2/1995 |
| JP | H07-299891 | 11/1995 |
| JP | 9158092 | 6/1997 |
| JP | 2000008299 | 1/2000 |
| JP | 2000-041354 | 2/2000 |
| JP | 200115547 | 6/2001 |
| JP | 3267815 | 1/2002 |
| JP | 2002051492 | 2/2002 |
| JP | 2006022432 | 1/2006 |
| RU | 2051434 | 12/1995 |
| RU | 113 U1 | 10/1997 |
| RU | 95116675 A | 11/1997 |
| WO | WO 8911151 | 11/1989 |
| WO | WO 2004/031466 | 4/2004 |
| WO | WO 2012/082180 | 6/2012 |

OTHER PUBLICATIONS

Product Data Sheet, Innovative Paper Technologies, LLC, URL <http://www.iptllc.net/insulation/ThermaVoltDS.pdf>.
El DuPont de Nemours & Co. et al., Calendered Spunlaced Nomex Aramid Sheets, Research Disclosure, Mason Publications, Feb. 1, 1975, vol. 130, No. 2.
International Search Report for PCT/US2011/037755, issued Aug. 23, 2011.
PCT/US2013/030200, International Search Report, Jun. 21, 2013.
Office Action in U.S. Appl. No. 13/793,811 dated Apr. 24, 2014 (22pgs).
Response to Office Action in U.S. Appl. No. 13/793,811 dated Apr. 24, 2014 filed on Jul. 24, 2014 (10pgs).
Final Office Action in U.S. Appl. No. 13/793,811 dated Oct. 6, 2014 (22pgs).
Ishlinskij, Great Encycpodepic Dictionary: Polytechnical Dictionary, Moscow, Great Russian Encyclopeida, 2000.
Russian Search Report, dated Oct. 20, 2014, 2pgs.
Search Report for RU 2014149281, mailed on Feb. 20, 2016, 2 pp.

* cited by examiner

ELECTRICAL INSULATION MATERIAL

TECHNICAL FIELD

This invention relates to materials suitable for electrical insulation applications.

BACKGROUND

Electrical equipment such as electric motors, generators, and transformers often require some form of dielectric insulation to separate a conductor at one voltage from a conductor at a different voltage and/or to provide mechanical protection to electrical components. Laminates of electrical insulation materials are often used in the industry for this purpose. Examples of such materials are described in WO 2012/082180; JP 2000/008299; CA 2003221; and JP 9158092.

SUMMARY

There is a need in certain electrical insulation applications for materials that achieve a high flame resistance rating (e.g., UL 94V-0) while still providing superior mechanical strength and retained flexibility after heat aging.

The materials of the present invention are suitable for insulating electrical components in transformers, motors, generators, and other devices requiring insulation of electrical components, particularly those that have flame retardancy requirements. At least some embodiments of the present invention provide a unique flexible electrical insulation article having excellent mechanical strength, flexibility, and flame resistance. At least some embodiments of the present invention are able to achieve high flame resistance ratings even though they contain some flammable materials. At least some embodiments of the present invention provide an electrical insulating material having a desirable balance of properties including flame retardancy, dielectric strength, tensile strength, and tear strength. At least some embodiments of the present invention further provide desirable thermal conductivity properties.

At least one embodiment of the present invention provides an article comprising a non-cellulosic nonwoven fabric layer having first and second opposing major surfaces and having a non-cellulosic nonwoven paper layer attached to each major surface of the nonwoven fabric layer wherein one or both of the nonwoven paper and nonwoven fabric are electrically insulating.

As used in this specification:

"non-cellulosic" means containing less than 10 wt % cellulosic material, preferably containing less than 5 wt % cellulosic material, more preferably containing only trace amounts of cellulosic material, and most preferably containing no cellulosic material.

"directly fused" means having no intervening layer such as an adhesive layer;

"nonwoven paper" means a sheet material primarily comprised of short fibers;

"nonwoven fabric" means a sheet material primarily comprised of long fibers;

"short fibers" means fibers less than one inch long;

"long fibers" means fibers greater than or equal to one inch long;

"MD" or "machine direction" refers to the direction parallel to the windup direction of a continuous sheet of material; and "CD" or "cross direction" refers to the direction perpendicular to the windup direction of a continuous sheet of material.

An advantage of at least one embodiment of the present invention is that it achieves a V-0 rating under UL 94 flame resistance testing, even though it contains flammable fiber materials, while also being flexible and having good mechanical strength.

The above summary of the present invention is not intended to describe each disclosed embodiment or every implementation of the present invention. The detailed description that follows below more specifically illustrates embodiments of the invention.

DETAILED DESCRIPTION

In the following description, it is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the present specification and attached claims are approximations that can vary depending upon the desired properties sought to be obtained by those skilled in the art utilizing the teachings disclosed herein. The use of numerical ranges by endpoints includes all numbers and any value within that range (e.g., 1 to 5 includes 1, 1.5, 2, 2.75, 3, 3.80, 4, and 5).

At least one embodiment of the present invention provides a nonwoven fabric layer between two nonwoven paper layers. Other embodiments provide alternating layers of nonwoven paper and nonwoven fabric. Some embodiments provide multiple layers of nonwoven fabric adjacent to each other and between nonwoven paper layers. Some embodiments further include adhesive between two adjacent layers.

At least some embodiments of articles that provide flame resistance include flammable materials. For example, some embodiments include PET nonwoven fabrics, which are flammable. In at least some embodiments, it was found that placing the flammable nonwoven fabric layer between at least two outer nonwoven paper layers, provided excellent flame resistance properties for the articles.

The nonwoven paper layer of at least some embodiments of the present invention comprises a sheet material made of short fibers, i.e., fibers less than one inch (2.54 cm) long. In at least one embodiment of the present invention, the majority of the fibers in the nonwoven paper are organic. However, many embodiments may include nonwoven papers with inorganic fibers or fillers.

Examples of commercially available nonwoven papers suitable for use in the present invention includes those available from 3M Company, USA, under the trade designations CeQUIN, including but not limited to CeQUIN I (about 90% inorganic content), CeQUIN II (two-layer (ply) composites of CeQUIN I), CeQUIN X (enhanced wet strength for B-stage applications), and CeQUIN 3000 (about 74% inorganic content plus organic fiber reinforcement); FLAME BARRIER FRB including, but not limited to, FLAME BARRIER-FRB-NT calendered insulation paper and FLAME BARRIER FRB-NC uncalendered insulation paper; those available from DuPont (www2.dupont.com) under the trade designation NOMEX, including but not limited to NOMEX Paper Type 410, Type 411 (lower density version), Type 414, Type 418 (includes mica), Type 419 (lower density version of Type 418), and Type E56; those available from SRO Group (China) Limited under the trade designation X-FIPER; and those available from Yantai Metastar Special Paper Co., Ltd., China, under the trade designation METASTAR.

Suitable nonwoven papers may include organic and inorganic fibers such as, but not limited to, aramids, including meta-aramids and para-aramids, polyphenylene sulfide (PPS), polyester, polyamides, acrylic, melamine, glass, polyolefin, and polyimide. In at least one embodiment of the present invention, the nonwoven paper also comprises a polymeric binder. Suitable polymeric binders include, but are not limited to, acrylic, nitrile, styrene acrylic latex, guar gum, starch, and natural rubber latex.

In at least one embodiment of the present invention, the nonwoven paper also comprises one or more inorganic fillers. Suitable inorganic fillers include, but are not limited to, kaolin clay, talc, mica, calcium carbonate, alumina trihydrate, montmorillonite, smectite, bentonite, illite, chlorite, sepiolite, attapulgite, halloysite, vermiculite, laponite, rectorite, perlite, aluminum nitride, silicon carbide, boron nitride, and combinations thereof. Suitable types of kaolin clay include, but are not limited to, water-washed kaolin clay; delaminated kaolin clay; calcined kaolin clay; and surface-treated kaolin clay.

Nonwoven papers of the invention containing one or both of inorganic fibers and inorganic particles may be referred to as inorganic based papers. Inorganic based papers provide improved long term voltage endurance in the presence of corona/partial discharge compared to, for example, completely organic based meta-aramid papers because inorganic materials are known to be much more resistant to corona than organic materials. (See, e.g., The Electrical Insulation Conference (EIC)/Electrical Manufacturing and Coil Winding (EMCW) Expo 2001, Cincinnati, Ohio Oct. 15-Oct. 18, 2001, High Temperature Electrical Insulation Short Course, p. 21). These inorganic based papers can also provide greater dimensional stability as well as higher thermal conductivity for improved heat dissipation compared to, for example, completely organic based meta-aramid papers.

The nonwoven fabric layer of at least some embodiments of the present invention comprises a sheet material made of long fibers, i.e., fibers greater than or equal to one inch (2.54 cm) long.

Nonwoven fabric layers are typically made primarily of organic fibers but can contain inorganic fibers. Examples of suitable organic fibers for making the nonwoven fabric include, but are not limited to, aramid fibers, including meta-aramid and para-aramid fibers. At least some embodiments of nonwoven fabrics suitable for use in the present invention may include one or both of meta-aramid and para-aramid fibers. In at least one embodiment of the present invention, aramid fibers are a preferred component of the nonwoven fabric layer. At least some embodiments of nonwoven fabrics of the present invention may include one or more types of aramid fibers. The types of aramid fibers include, but are not limited to, meta-aramid, para-aramid, modified meta- or para-aramids, or other types of aramids. The nonwoven fabric may comprise aramid fibers in an amount 0 (zero) to 100 wt %. In at least one embodiment, the nonwoven fabric comprises about 20 wt % to about 70 wt % aramid fibers.

Suitable non-aramid organic fibers include, but are not limited to polyphenylene sulfide (PPS), polyesters including polyethylene terephthalate (PET) and poly(cyclohexylene-dimethylene terepthalate) (PCT), glycol-modified polyester, polyphenyl sulfone, polyamide (nylon), and polypropylene fibers. The nonwoven fabric may comprise non-aramid fibers in an amount of about 0 (zero) to 100 wt %. In at least one embodiment, the nonwoven fabric comprises about 30 wt % to about 80 wt % non-aramid fibers. Nonwoven fabrics suitable for use in the present invention may comprise staple (i.e., non-binding) fibers and binder fibers. Staple fibers may include, for example, meta-aramid and para-aramid, polyphenylene sulfide (PPS), polyesters including polyethylene terephthalate (PET), glycol-modified polyester, polyphenyl sulfone, nylon, and polypropylene fibers. Binder fibers may include, for example, meta-aramid, polyphenylene sulfide (PPS), polyesters including polyester terephthalate (PET) and poly(cyclohexylene-dimethylene terepthalate)(PCT), glycol-modified polyester, polyphenyl sulfone, and polypropylene fibers. Typically, the binder fibers will soften and/or flow upon the application of heat and/or pressure, which allows them to bond with the staple fibers. Binder fibers may comprise a single polymer and/or a bicomponent configuration with two polymers having different chemical and/or physical properties.

For nonwoven fabrics suitable for use in the present invention made with staple fibers and binder fibers, staple fibers may typically comprise about 30 wt % to about 80 wt % of the fabric and binder fibers may typically comprise about 20 wt % to about 70 wt % of the fabric.

In some embodiments of the present invention, instead of, or in addition to, using binder fibers, the nonwoven fabrics may contain bonding agents to promote bonding of materials within the nonwoven fabric. Other means of bonding or strengthening the nonwoven fabrics include hydro-entangling, point bonding, or calendering.

The fibers are typically blended together to form the nonwoven fabric. The ability to blend different fibers allows greater design flexibility to meet product performance, such as improved tear strength, when compared to prior art methods such as laminating nonwoven paper to a continuous polyester film to increase paper strength.

The nonwoven fabrics typically comprise a network of fibers forming a flexible sheet material producible without weaving or knitting and held together by either (i) mechanically interlocking at least some of the fibers, (ii) fusing at least some parts of some of the fibers, or (iii) bonding at least some of the fibers by use of a bonding material. Prior to bonding or fusing some of the fibers, the nonwoven fabric may resemble batting, a soft bulky assembly of fibers.

The nonwoven fabrics may be in any suitable form such as, but not limited to, carded nonwoven webs, spunbonded webs, melt blown webs, scrims, cloths, unidirectional webs, felts, spunlaced webs, hydrolaced webs, and the like.

In at least one embodiment, a carded nonwoven web may include about 20 wt % to about 70 wt % of blends of aramid fibers and about 30 wt % to about 80 wt % of other non-aramid fibers.

The nonwoven fabrics of the present invention can be made by any suitable method known in the art. Typical methods include dry forming (dry-laid) processes used with fibers typically equal to or longer than one inch. The longer fibers used in dry forming processes typically result in nonwoven fabrics with open, porous structures having good mechanical strength. Examples of dry forming processes include carding and spunbonding. In a typical dry forming carding process, clumps of staple fibers are separated mechanically into individual fibers and formed into a coherent web. A carding machine uses opposed moving beds of closely spaced needles to pull and separate the clumps. To be grasped by the needles, the input fibers used in carding are typically crimped, i.e., made wavy.

Commercially available nonwoven fabrics suitable for use in the present invention includes those available from 3M Company, under the trade designations THERMAL SHIELD (a nonwoven PPS material) and those available from DuPont (www2.dupont.com) under the trade designation NOMEX LT, including but not limited to Type 180.

The nonwoven paper and nonwoven fabric layers may comprise one or more sheets, i.e., plies or sub-layers, which are combined to form the layer. The plies or sub-layers may be the same or different materials. The sheets may be combined by any suitable means such as using a chemical adhesive or by processes such as hot calendering.

In at least one other embodiment, a nonwoven fabric layer is placed between two nonwoven paper layers and directly fused to the two nonwoven paper layers. In at least one embodiment, the nonwoven fabric layer and at least one of the nonwoven paper layers are fused together by mechanical and thermal bonding through heat and pressure by means of a hot calendar stack.

In making the articles of some embodiments of the present invention, no adhesive (i.e., beyond what may have been used in forming a nonwoven paper or fabric layer) is applied to join the various layers or sub-layers together. Instead, the nonwoven fabric layer and nonwoven paper layer(s) are bonded by calendering with only heat and pressure.

In making the articles of some other embodiments of the present invention, some type of adhesion of the layers is used. The adhesion may be accomplished by, e.g., the presence of a thermoplastic layer in the construction, the addition of an adhesive between layers, or adhesion enhancing surface-treatments such as plasma treatments. Any suitable adhesive may be used. For example, the adhesive may be water-based or solvent-based. The adhesive may have any suitable composition. Examples of suitable compositions include acrylic, styrene, and polyester. Optionally, and preferably, a flame retardant may be added to the adhesive. The flame retardant may be any suitable material. Examples of suitable flame retardant materials include metal hydroxides, e.g., ATH and MgOH, and organophosphates. The flame retardant may comprise up to about 50 wt % of the adhesive, preferably up to 30 wt %. Adding too much flame retardant will decrease the adhesive properties of the adhesive.

An adhesive may be most suitable in embodiments having relatively thick nonwoven paper layer. In these types of thicker product construction, a longer time (slower line speed) is required for heat to transfer into the layers. Therefore, in some situations, it can be advantageous to apply an adhesive to bond certain layers together so that faster line speeds can be utilized.

The formulation of the nonwoven fabric can also be designed to bond to, or to facilitate integration with, the nonwoven paper so that an adhesive need not be applied. For example, the presence of binder fibers, bonding agents, or spunbonded (thermoplastic) fibers in a nonwoven fabric layer can cause the nonwoven paper and fabric layers to bond together upon the application of heat and/or pressure.

The nonwoven paper layer and nonwoven fabric layer(s) may be formed and combined or integrated in a continuous process (inline integration) or in discrete steps (offline integration).

As previously stated, the articles of the present invention are suitable for insulating electrical components in transformers, motors, generators, and other devices requiring insulation of electrical components. At least some embodiments of the present invention are suitable for use in transformers that have flame resistance requirements such as transformers used in the mining, shipping, and rail industries. Requirements of different product applications can be addressed with different combinations of the nonwoven papers and nonwoven fabrics of the present invention. For example, the weight ratios of the nonwoven paper and nonwoven fabric can be adjusted. For at least some articles of the present invention, the nonwoven fabric layer comprises about 3 wt % to about 50 wt % and the nonwoven paper layers comprise about 50 wt % to about 97 wt %. Preferred structures will vary depending on layer thicknesses and other factors.

Each layer of the insulating article can contribute to the unique properties of the final construction. For example, in some embodiments the nonwoven paper can provide flame resistance, long term heat resistance, and desirable electrical properties; the nonwoven fabric can provide excellent resistance to tear, while also enhancing tensile strength and overall flexibility after heat aging. The combination of the two types of layers provides an article having flame resistance, physical strength, and desirable electrical properties, while maintaining excellent flexibility after high temperature heat aging at about 464° F. (240° C.).

In at least some embodiments of the present invention, the insulating article has a dielectric breakdown strength of greater than 100 volts/mil (3.9 kilovolts/mm), preferably greater than or equal to 150 V/mil (5.9 kV/mm), when measured according to ASTM D149-09.

In at least some embodiments of the present invention, the insulating article has a thermal conductivity of 0.18 W/m·K or greater when measured according to ASTM E1530-11.

EXAMPLES

The following examples and comparative examples are offered to aid in the understanding of the present invention and are not to be construed as limiting the scope thereof. Unless otherwise indicated, all parts and percentages are by weight. The following test methods and protocols were employed in the evaluation of the illustrative and comparative examples that follow.

Materials List

| PRODUCT NAME | DESCRIPTION | SOURCE |
| --- | --- | --- |
| FLAME BARRIER FRB-NT | Calendered Insulating Nonwoven Paper | 3M Company, USA |
| FLAME BARRIER FRB-NC | Uncalendered Insulating Nonwoven Paper | 3M Company, USA |
| TWARON Type 1070 | P-Aramid Fibers, 1.7 denier × 2" | Teijin Aramid, The Netherlands |
| Type 221 | Polyester (PET) Staple Fibers, 1.5d × 1.5" | Invista, USA |
| T-109 | Undrawn Polyester Binder Fiber, 3d × 1" | Fiber Innovation Technology, USA |

-continued

| PRODUCT NAME | DESCRIPTION | SOURCE |
|---|---|---|
| T-201 | Bicomponent Polyester (PET) Binder Fiber with 110° C. Amorphous Outer Sheath (2d × 1.5") | Fiber Innovation Technology, USA |
| NEXYLENE PPS Type S970 | Polyphenylene Sulfide (PPS) Binder Fibers (2.7d × 1.5") | Nexis Fibers, Switzerland |
| T-184 | Polyphenylene Sulfide (PPS) Binder Fibers (2.7d × 2") | Fiber Innovation Technology, USA |
| T-281 | Bicomponent PET Binder Fiber with PPS Outer Sheath, Undrawn (6d × 1.5") | Fiber Innovation Technology, USA |
| ROBOND L-330 | Adhesive, 45% Solids in Aqueous Dispersion | Dow Chemical Company, USA |
| CR-9-101 | Coreactant/Catalyst for ROBOND L-330 | Dow Chemical Company, USA |
| TI-Rite #HA | Alumina Trihydrate (ATH), 51.5% in Aqueous Dispersion | Technical Industries, USA |

Test Methodologies

| PROPERTY | TEST METHOD | TITLE |
|---|---|---|
| Thickness | ASTM D-645/645M-97 (2007) | Standard Test Method for Thickness of Paper and Paperboard |
| Basis Weight | ASTM D-646-96 (2007) | Standard Test Method for Grammage of Paper and Paperboard (Mass per Unit Area) |
| MD Tensile Strength | ASTM D-828-97 (2002) | Standard Test Method for Tensile Properties of Paper and Paperboard Using Constant-Rate-of-Elongation Apparatus |
| MD Elongation | ASTM D-828-97 (2002) | Standard Test Method for Tensile Properties of Paper and Paperboard Using Constant-Rate-of-Elongation Apparatus |
| CD Tear Strength | Tappi T-414 om-04 | Internal Tearing Resistance of Paper (Elmendorf-Type Method) |
| MD Tear Strength | Tappi T-414 om-04 | Internal Tearing Resistance of Paper (Elmendorf-Type Method) |
| Dielectric Breakdown Strength | ASTM-D149-09 | Standard Test Method for Dielectric Breakdown Voltage and Dielectric Breakdown Strength of Solid Electrical Insulating Materials at Commercial Power Frequencies |
| Retained Heat Aged MD Tensile Strength | Samples were placed in an oven and exposed to 464° F. (240° C.) for 2 weeks. Samples were then cooled to room temperature and tested according to ASTM D828-97 (2002). | |
| Retained Heat Aged MD Elongation | Samples were placed in an oven and exposed to 464° F. (240° C.) for 2 weeks. Samples were then cooled to room temperature and tested according to ASTM D828-97 (2002). | |
| Retained Heat Aged Dielectric Breakdown Strength | Samples were placed in an oven and exposed to 464° F. (240° C.) for 2 weeks. Samples were then cooled to room temperature and tested according to ASTM ASTM-D149-09. | |
| Flammability Classification | UL94 | Standard for Safety of Flammability of Plastic Materials for Parts in Devices and Appliances |
| Thermal Conductivity | ASTM E1530-11 | Standard Test Method for Evaluating the Resistance to Thermal Transmission of Materials by the Guarded Heat Flow Meter Technique |

Comparative Examples CE1 and CE2

Comparative Examples CE1 and CE2 were made using only nonwoven paper layers, i.e., no nonwoven fabric layers were used. CE1 and CE2 used commercially available nonwoven papers with the sources noted in the Materials List above. The structure, process conditions and test results are provided in Table 1. The Composite Structure of "5-5-5" for CE2 indicates that three layers of FLAME BARRIER FRB-NC uncalendered nonwoven paper, each of which would be 5 mil thick after calendering, were stacked together and calendered at the conditions indicated to form CE2.

TABLE 1

| EXAMPLE | CE1 | CE2 |
|---|---|---|
| Nonwoven Paper | FLAME BARRIER FRB-NT | FLAME BARRIER FRB-NC |
| Nonwoven Paper Thickness | 5 mil (0.13 mm) | 5 mil (0.13 mm) |
| Composite Structure | NA | 5-5-5 |
| Composite Calendering Temperature | NA | 375-385° F. (191-196° C.) |
| Composite Calendering Pressure | NA | 1000 pli (179 kg/cm) |
| Composite Calendering Speed | NA | 3 ft/min (0.9 m/min) |
| Composite Thickness | 5 mil (0.13 mm) | 13.8 mil (0.35 mm) |
| Basis Weight | 155 gsy (185 g/m$^2$) | 466 gsy (557 g/m$^2$) |
| Density | 91 lbs/ft$^3$ (1.5 g/cm$^3$) | 102 lbs/ft$^3$ (1.6 g/cm$^3$) |
| UL 94 Vertical Burn Rating | V0 | V0 |
| MD Tensile strength | 36 lbs/in (63 N/cm) | 89 lbs/in (156 N/cm) |
| MD Elongation | 1.6% | 2% |
| CD tear strength | 0.34 lb (152 g) | 2.0 lb (688 g) |
| MD tear strength | 0.26 lb (116 g) | 1.5 lb (480 g) |
| Dielectric Breakdown Strength | 500 V/mil (19.7 kV/mm) | 736 V/mil (29.0 kV/mm) |
| Retained Heat Aged MD Tensile Strength | 9.5 lbs/in (17 N/cm) | |
| Retained Heat Aged Elongation | 0.5% | |
| Thermal Conductivity (180° C.) | 0.17 W/m · K | 0.25 W/m · K |

Nonwoven Fabric Layers:

Six different nonwoven fabric blends were used to prepare Examples 1-27 and Comparative Examples CE3-CE7. Nonwoven fabric blends NW1-NW6 consisted of blends of p-aramid fibers, polyester (PET) staple fibers, undrawn PET fibers, bicomponent polyester binder fibers, polyphenylene sulfide (PPS) binder fibers, and/or bicomponent PET/PPS fibers in the amounts provided in Table 2. The fiber mixtures were passed through a carding machine to yield nonwoven battings with basis weights between 22-24 gsy (grams per square yard). The nonwoven batting was then calendered through a steel cotton nip, with the steel roll heated to a temperature between 230-240° F. (110-116° C.) and a nip pressure between 590 lb/in (106 kg/cm)-800 lb/in (143 kg/cm.)

Adhesive for Lamination of Thick Composite Papers:

To prepare the adhesive used in Example 27 as described later, CR-9-101 catalyst was added to ROBOND L-330 adhesive dispersion and mixed for 15 minutes at room temperature. TI-Rite #HA aqueous dispersion was added to the mixture and mixed until well dispersed. The final composition of the adhesive formulation is provided below.

| PRODUCT NAME | SOLIDS WEIGHT % OF FORMULATION |
|---|---|
| ROBOND L-330 | 63.9% |
| CR-9-101 | 5.7% |
| TI-Rite #HA | 30.4% |

Composite Insulating Papers

To create the composite insulating papers for Comparative Examples CE3-CE7 and Examples 1-27, the nonwoven fabric layers and nonwoven paper layers were arranged and fused together by mechanical and thermal bonding through heat and pressure by means of a hot calendar stack. Nonwoven fabric blend, nonwoven paper thickness, and composite construction for Comparative Examples CE3-CE7 and Examples 1-27 are provided in Tables 3-7. All examples used FLAME BARRIER FRB-NC uncalendered nonwoven paper. The values for nonwoven paper thickness listed in Tables 2-7 refer to the thickness that each layer of FLAME BARRIER FRB-NC would have after calendering. The table below provides equivalent thicknesses for the nonwoven paper before and after calendering.

| NONWOVEN PAPER | FORM | EQUIVALENT THICKNESSES, MIL | | | | |
|---|---|---|---|---|---|---|
| FLAME BARRIER FRB-NC | Uncalendered | 3 | 5 | 7 | 9 | 12 |
| FLAME BARRIER FRB-NT | Calendered | 2 | 3 | 4 | 5 | 7 |

Under the heading "Composite Structure," in Tables 3-7, "NW" refers to the nonwoven fabric layer(s), and the numbers refer to the thickness of the nonwoven paper. For example, a composite structure of "7-NW-7" indicates that one nonwoven fabric layer was placed between two nonwoven paper layers, each of which was 7 mil thick after calendering. For Examples 1-26, no adhesive was applied to the surface of any layer. Final composite calendering was conducted between steel rolls at a temperature between 375-385° F. (191-196° C.) and a nip pressure of 1000 lb/in

TABLE 2

| COMPONENT | NW1 | NW2 | NW3 | NW4 | NW5 | NW6 |
|---|---|---|---|---|---|---|
| P-aramid Fibers, TWARON Type 1070 | 40 wt % | 40 wt % | 40 wt % | 40 wt % | 50 wt % | 60 wt % |
| PET Staple Fibers, Type 221 | 10 wt % | | | | | |
| Undrawn PET Fiber, Type 109 | 25 wt % | 15 wt % | 15 wt % | | 20 wt % | 20 wt % |
| Bicomponent PET Fibers, Type 201 | 25 wt % | 15 wt % | 15 wt % | 15 wt % | 20 wt % | 20 wt % |
| PPS Binder Fibers, NEXYLENE Type S970 | | 30 wt % | | | | |
| PPS Binder Fibers, Type 184 | | | 30 wt % | 15 wt % | 10 wt % | |
| Bicomponent PET/PPS Fibers, Type 281 | | | | 30 wt % | | |
| Total Amount of Flammable Fibers | 60 wt % | 30 wt % | 30 wt % | 27 wt % | 40 wt % | 40 wt % |

(179 kg/cm). Examples CE3-CE4, 1-6, and 23-27 were passed through the steel-steel nip twice.

Examples 1, 4, 5, and 6 were composed of three nonwoven paper layers and two nonwoven fabric layers in alternating layers, with the structure of nonwoven paper-nonwoven fabric-nonwoven paper-nonwoven fabric-nonwoven paper. Examples 2, 7, 8, and 12-26 were composed of two nonwoven fabric layers placed between two nonwoven paper layers. Examples 3, 9, 10, and 11 were composed of one nonwoven fabric layer placed between two nonwoven paper layers. Example 27 was prepared by placing two nonwoven fabric layers between two nonwoven paper layers, calendering to create a composite paper, applying the flame retardant adhesive described previously between two layers of this composite paper, and calendering the entire stack to create a thick composite paper. Comparative Examples CE3-CE7 were formed using 1, 2, or 3 nonwoven paper layer(s) placed between two nonwoven fabric layers.

Standard properties and UL 94 vertical burn test results for Examples 1-26 and Comparative Examples CE3-CE7 are shown in Tables 3-7. Examples 1-6 and 23-26 and Comparative Examples CE3 and CE4 had a final composite thickness of approximately 15 mil (0.38 mm) Examples 7, 8, 11, 12, and 15-18 were approximately 7 mil (0.18 mm) thick. Examples 9, 10, 13, and 14 and Comparative Examples CE5-CE7 were approximately 5 mil (0.13 mm) thick. Examples 19-22 had a final composite thickness of approximately 10 mil (0.25 mm) Example 27 was 24.6 mil (0.62 mm) thick.

While standard FLAME BARRIER FRB-NT nonwoven paper has excellent flame retardance properties on its own, as seen in Examples CE1 and CE2 in Table 1, combining it with nonwoven fabric layers improves mechanical (tensile and tear) strength and retained heat aged flexibility.

TABLE 3

| EXAMPLE | CE3 | CE4 | 1 | 2 | 3 | 4 | 5 | 6 |
|---|---|---|---|---|---|---|---|---|
| NW Paper Thickness(es) | 5 mil (0.13 mm) | 7 mil (0.18 mm) | 4 & 5 mil (0.10 & 0.13 mm) | 7 mil (0.18 mm) | 7 mil (0.18 mm) | 5 mil (0.13 mm) | 4 & 5 mil (0.10 & 0.13 mm) | 4 & 5 mil (0.10 & 0.13 mm) |
| NW Fabric Blend | NW1 | NW1 | NW1 | NW1 | NW1 | NW1 | NW2 | NW3 |
| NW Fabric Basis Weight | 22 gsy (26 g/m$^2$) | 22 gsy (26 g/m$^2$) | 23 gsy (28 g/m$^2$) | 23 gsy (28 g/m$^2$) | 22 gsy (26 g/m$^2$) | 22 gsy (26 g/m$^2$) | 22 gsy (26 g/m$^2$) | 24 gsy (29 g/m$^2$) |
| Composite Structure | NW-5-5-5-NW | NW-7-7-NW | 4-NW-5-NW-4 | 7-NW-NW-7 | 7-NW-7 | 5-NW-5-NW-5 | 4-NW-5-NW-4 | 4-NW-5-NW-4 |
| NW Fabric Wt % | 9 | 9 | 10 | 9 | 5 | 9 | 10 | 11 |
| Composite Thickness | 16.7 mil (0.42 mm) | 16.4 mil (0.42 mm) | 13.7 mil (0.35 mm) | 14.3 mil (0.36 mm) | 15 mil (0.38 mm) | 15.7 mil (0.40 mm) | 13.5 mil (0.34 mm) | 13.6 mil (0.35 mm) |
| Composite Basis Weight | | | 458 gsy (548 g/m$^2$) | 477 gsy (570 g/m$^2$) | | | 465 gsy (556 g/m$^2$) | 465 gsy (556 g/m$^2$) |
| Composite Density | | | 98 lb/ft$^3$ (1.6 g/cc) | 95 lb/ft$^3$ (1.5 g/cc) | | | 101 lb/ft$^3$ (1.6 g/cc) | 101 lb/ft$^3$ (1.6 g/cc) |
| UL 94 Vertical Burn Rating | NC* | NC* | NC* | NC* | V0 | V0 | V0 | V0 |
| MD Tensile Strength | 167 lb/in (292 N/cm) | 169 lb/in (296 N/cm) | 148 lb/in (259 N/cm) | 157 lb/in (275 N/cm) | | 169 lb/in (296 N/cm) | 154 lb/in (270 N/cm) | 150 lb/in (263 N/cm) |
| MD Elongation | 3.5% | 3.1% | 3.8% | 3.7% | | 3.4% | 4.3% | 4.0% |
| CD Tear Strength | 3.14 lb (1424 g) | 3.67 lb (1664 g) | 1.76 lb (800 g) | 2.08 lb (944 g) | | 3.17 lb (1440 g) | 1.76 lb (800 g) | 1.76 lb (800 g) |
| MD Tear Strength | 1.62 lb (736 g) | 1.69 lb (768 g) | | | | 1.62 lb (736 g) | | |
| Dielectric Breakdown Strength | 593 V/mil (23.3 kV/mm) | 490 V/mil (19.3 kV/mm) | 742 V/mil (29.2 kV/mm) | 534 V/mil (21.0 kV/mm) | | 677 V/mil (26.7 kV/mm) | 767 V/mil (30.2 kV/mm) | 804 V/mil (31.7 kV/mm) |
| Thermal Conductivity | | | 0.25 W/m·K | | | | | |

*Not classifiable

TABLE 4

| EXAMPLE | CE5 | CE6 | CE7 | 7 | 8 | 9 | 10 | 11 | 12 |
|---|---|---|---|---|---|---|---|---|---|
| NW Paper Thickness | 3 mil (0.076 mm) | 3 mil (0.076 mm) | 3 mil (0.076 mm) | 3 mil (0.076 mm) | 3 mil (0.076 mm) | 3 mil (0.076 mm) | 3 mil (0.076 mm) | 3 mil (0.076 mm) | 3 mil (0.076 mm) |
| NW Fabric Blend | NW1 | NW2 | NW3 | NW1 | NW2 | NW1 | NW2 | NW3 | NW3 |
| NW Fabric Basis Wt | 23 gsy (28 g/m$^2$) | 22 gsy (26 g/m$^2$) | 24 gsy (29 g/m$^2$) | 23 gsy (28 g/m$^2$) | 22 gsy (26 g/m$^2$) | 23 gsy (28 g/m$^2$) | 22 gsy (26 g/m$^2$) | 24 gsy (29 g/m$^2$) | 22 gsy (26 g/m$^2$) |
| NW Fabric Wt % | 35 | 34 | 36 | 21 | 20 | 12 | 11 | 12 | 20 |
| Composite Structure | NW-3-NW | NW-3-NW | NW-3-NW | 3-NW-NW-3 | 3-NW-NW-3 | 3-NW-3 | 3-NW-3 | 3-NW-3 | 3-NW-NW-3 |

TABLE 4-continued

| EXAMPLE | CE5 | CE6 | CE7 | 7 | 8 | 9 | 10 | 11 | 12 |
|---|---|---|---|---|---|---|---|---|---|
| Composite Thickness | 5 mil (0.13 mm) | 5 mil (0.13 mm) | 5 mil (0.13 mm) | 6.75 mil (0.17 mm) | 6.65 mil (0.17 mm) | 5.7 mil (0.14 mm) | 5.75 mil (0.15 mm) | 6.1 mil (0.15 mm) | 6.95 mil (0.18 mm) |
| Composite Basis Weight | | | | 204 gsy (244 g/m$^2$) | 202 gsy (242 g/m$^2$) | 184 gsy (220 g/m$^2$) | 184 gsy (220 g/m$^2$) | 190 gsy (227 g/m$^2$) | 211 gsy (252 g/m$^2$) |
| Composite Density | | | | 89 lb/ft$^3$ (1.4 g/cc) | 89 lb/ft$^3$ (1.4 g/cc) | 92 lb/ft$^3$ (1.5 g/cc) | 94 lb/ft$^3$ (1.5 g/cc) | 91 lb/ft$^3$ (1.5 g/cc) | 89 lb/ft$^3$ (1.4 g/cc) |
| UL 94 Vertical Burn Rating | NC* | NC* | NC* | NC* | V0 | V0 | V0 | V0 | V0 |
| MD Tensile Strength | | | | 92 lb/in (161 N/cm) | 82 lb/in (144 N/cm) | 63 lb/in (110 N/cm) | 63 lb/in (110 N/cm) | 69 lb/in (121 N/cm) | 86 lb/in (151 N/cm) |
| MD Elongation | | | | 4.2% | 4.3% | 3.3% | 3.5% | 3.7% | 4.3% |
| Dielectric Brkdn Strength | | | | 496 V/mil (19.5 kV/mm) | 496 V/mil (19.5 kV/mm) | 568 V/mil (22.4 kV/mm) | 583 V/mil (23.0 kV/mm) | 545 V/mil (21.5 kV/mm) | 487 V/mil (19.2 kV/mm) |
| Retained Heat Aged MD Tensile Strength | | | | 28 lb/in (49 N/cm) | 28 lb/in (49 N/cm) | 18 lb/in (32 N/cm) | 17 lb/in (30 N/cm) | 21 lb/in (37 N/cm) | 28 lb/in (49 N/cm) |
| Retained Heat Aged MD Elongation | | | | 0.94% | 0.80% | 0.64% | 0.50% | 0.80% | 0.90% |

*Not classifiable

TABLE 4

| EXAMPLE | 13 | 14 | 15 | 16 | 17 | 18 |
|---|---|---|---|---|---|---|
| NW Paper Thickness | 2 mil (0.051 mm) | 2 mil (0.051 mm) | 3 mil (0.076 mm) | 3 mil (0.076 mm) | 3 mil (0.076 mm) | 3 mil (0.076 mm) |
| NW Fabric Blend | NW1 | NW4 | NW1 | NW4 | NW5 | NW6 |
| NW Fabric Basis Weight | 23 gsy (28 g/m$^2$) | 22 gsy (26 g/m$^2$) | 23 gsy (28 g/m$^2$) | 22 gsy (26 g/m$^2$) | 22 gsy (26 g/m$^2$) | 22 gsy (26 g/m$^2$) |
| Composite Structure | 2-NW-NW-2 | 2-NW-NW-2 | 3-NW-NW-3 | 3-NW-NW-3 | 3-NW-NW-3 | 3-NW-NW-3 |
| NW Fabric Wt % | 30 | 29 | 21 | 21 | 20 | |
| Composite Thickness | 5.3 mil (0.13 mm) | 5.2 mil (0.13 mm) | 7.2 mil (0.18 mm) | 7.0 mil (0.18 mm) | 7.2 mil (0.18 mm) | 7.6 mil (0.19 mm) |
| Composite Basis Weight | 153 gsy (183 g/m$^2$) | 152 gsy (182 g/m$^2$) | 218 gsy (261 g/m$^2$) | 205 gsy (245 g/m$^2$) | 218 gsy (261 g/m$^2$) | 215 gsy (257 g/m$^2$) |
| Composite Density | 85 lb/ft$^3$ (1.4 g/cc) | 86 lb/ft$^3$ (1.4 g/cc) | 89 lb/ft$^3$ (1.4 g/cc) | 86 lb/ft$^3$ (1.4 g/cc) | 89 lb/ft$^3$ (1.4 g/cc) | 83 lb/ft$^3$ (1.3 g/cc) |
| UL 94 Vertical Burn Rating | NC* | V0 | NC* | V0 | V0 | V0 |
| MD Tensile Strength | 75 lb/in (131 N/cm) | 73 lb/in (128 N/cm) | 113 lb/in (198 N/cm) | 95 lb/in (166 N/cm) | 117 lb/in (205 N/cm) | 122 lb/in (214 N/cm) |
| MD Elongation | 3.6% | 3.7% | 4.2% | 4.1% | 5.2% | 4.4% |
| CD Tear Strength | 0.60 lb (272 g) | 0.58 lb (264 g) | 0.97 lb (440 g) | 0.97 lb (442 g) | 1.1 lb (498 g) | 2.5 lb (1136 g) |
| Dielectric Breakdown Strength | 306 V/mil (12.0 kV/mm) | 306 V/mil (12.0 kV/mm) | 532 V/mil (20.9 kV/mm) | 514 V/mil (20.2 kV/mm) | 465 V/mil (18.3 kV/mm) | 421 V/mil (16.6 kV/mm) |
| Retained Heat Aged MD Tensile Strength | | | 41 lb/in (72 N/cm) | 38 lb/in (67 N/cm) | 43 lb/in (75 N/cm) | 35 lb/in (61 N/cm) |
| Retained Heat Aged MD Elongation | | | 1.2% | 0.90% | 1.5% | 1.3% |
| Retained Dielectric Breakdown Strength | | | 456 V/mil (18.0 kV/mm) | 416 V/mil (16.5 kV/mm) | 389 V/mil (15.3 kV/mm) | 368 V/mil (14.5 kV/mm) |
| Thermal Conductivity | | | 0.19 W/m · K | | 0.18 W/m · K | |

*Not classifiable

TABLE 6

| EXAMPLE | 19 | 20 | 21 | 22 |
|---|---|---|---|---|
| NW Paper Thickness(es) | 4 mil (0.10 mm) | 4 mil (0.10 mm) | 4 mil (0.10 mm) | 4 mil (0.10 mm) |
| NW Fabric Blend | NW1 | NW4 | NW5 | NW6 |
| NW Fabric Basis Weight | 23 gsy (28 g/m$^2$) | 22 gsy (26 g/m$^2$) | 22 gsy (26 g/m$^2$) | 22 gsy (26 g/m$^2$) |

TABLE 6-continued

| EXAMPLE | 19 | 20 | 21 | 22 |
|---|---|---|---|---|
| Composite Structure | 4-NW-NW-4 | 4-NW-NW-4 | 4-NW-NW-4 | 4-NW-NW-4 |
| NW Fabric Wt % | | 14 | 14 | |
| Composite Thickness | 10.1 mil | 9.3 mil | 10.0 mil | 10.2 mil |
| | (0.26 mm) | (0.24 mm) | (0.25 mm) | (0.26 mm) |
| Composite Basis Weight | 311 gsy | 297 gsy | 307 gsy | 302 gsy |
| | (372 g/m$^2$) | (355 g/m$^2$) | (367 g/m$^2$) | (361 g/m$^2$) |
| Composite Density | 90 lb/ft$^3$ | 94 lb/ft$^3$ | 91 lb/ft$^3$ | 87 lb/ft$^3$ |
| | (1.4 g/cc) | (1.5 g/cc) | (1.5 g/cc) | (1.4 g/cc) |
| UL 94 Vertical Burn Rating | NC* | V0 | V0 | V0 |
| MD Tensile Strength | 126 lb/in | 133 lb/in | 124 lb/in | 127 lb/in |
| | (221 N/cm) | (233 N/cm) | (217 N/cm) | (222 N/cm) |
| MD Elongation | 4.2% | 4.7% | 4.8% | 4.0% |
| CD Tear Strength | 1.38 lb | 1.31 lb | 1.71 lb | 3.56 lb |
| | (624 g) | (592 g) | (776 g) | (1616 g) |
| Dielectric Breakdown Strength | 477 V/mil | 634 V/mil | 492 V/mil | 539 V/mil |
| | (18.8 kV/mm) | (25.0 kV/mm) | (19.4 kV/mm) | (21.2 kV/mm) |
| Retained Heat Aged MD Tensile Strength | 53 lb/in | 52 lb/in | 52 lb/in | 39 lb/in |
| | (93 N/cm) | (91 N/cm) | (91 N/cm) | (68 N/cm) |
| Retained Heat Aged MD Elongation | 1.2% | 1.2% | 1.7% | 1.1% |
| Retained Dielectric Breakdown Strength | 468 V/mil | 583 V/mil | 450 V/mil | 490 V/mil |
| | (18.4 kV/mm) | (23.0 kV/mm) | (17.7 kV/mm) | (19.3 kV/mm) |

*Not classifiable

TABLE 7

| EXAMPLE | 23 | 24 | 25 | 26 | 27 |
|---|---|---|---|---|---|
| NW Paper Thickness | 7 mil | 7 mil | 7 mil | 7 mil | 5 mil |
| | (0.18 mm) | (0.18 mm) | (0.18 mm) | (0.18 mm) | (0.13 mm) |
| NW Fabric Blend | NW1 | NW4 | NW5 | NW6 | NW6 |
| NW Fabric Basis Weight | 23 gsy | 22 gsy | 22 gsy | 22 gsy | 22 gsy |
| | (28 g/m$^2$) | (26 g/m$^2$) | (26 g/m$^2$) | (26 g/m$^2$) | (26 g/m$^2$) |
| Composite Structure | 7-NW-NW-7 | 7-NW-NW-7 | 7-NW-NW-7 | 7-NW-NW-7 | 5-NW-NW-5-adhesive-5-NW-NW-5 |
| NW Fabric Wt % | 10 | 9 | 9 | 9 | |
| Composite Thickness | 15.3 mil | 15.2 mil | 15.1 mil | 16.7 mil | 24.6 mil |
| | (0.39 mm) | (0.39 mm) | (0.38 mm) | (0.42 mm) | (0.62 mm) |
| Composite Basis Weight | 483 gsy | 470 gsy | 488 gsy | 501 gsy | 761 gsy |
| | (578 g/m$^2$) | (562 g/m$^2$) | (584 g/m$^2$) | (599 g/m$^2$) | (910 g/m$^2$) |
| Composite Density | 93 lb/ft$^3$ | 91 lb/ft$^3$ | 95 lb/ft$^3$ | 88 lb/ft$^3$ | 91 lb/ft$^3$ |
| | (1.5 g/cc) | (1.5 g/cc) | (1.5 g/cc) | (1.4 g/cc) | (1.5 g/cc) |
| UL 94 Vertical Burn Rating | NC* | V0 | V0 | V0 | V0 |
| MD Tensile Strength | 176 lb/in | 165 lb/in | 165 lb/in | 173 lb/in | 240 lb/in |
| | (308 N/cm) | (289 N/cm) | (289 N/cm) | (303 N/cm) | (420 N/cm) |
| MD Elongation | 4.1% | 3.9% | 4.7% | 3.4% | 2.7% |
| CD Tear Strength | 2.38 lb | 2.47 lb | 2.89 lb | 6.07 lb | 7.05 lb |
| | (1080 g) | (1120 g) | (1312 g) | (2752 g) | (3200 g) |
| Dielectric Breakdown Strength | 539 V/mil | 548 V/mil | 533 V/mil | 452 V/mil | 497 V/mil |
| | (21.2 kV/mm) | (21.6 kV/mm) | (21.0 kV/mm) | (17.8 kV/mm) | (19.6 kV/mm) |
| Retained Heat Aged MD Tensile Strength | 64 lb/in | 62 lb/in | 55 lb/in | 50 lb/in | |
| | (112 N/cm) | (109 N/cm) | (96 N/cm) | (88 N/cm) | |
| Retained Heat Aged MD Elongation | 1.0% | 1.0% | 2.2% | 0.90% | |
| Retained Dielectric Breakdown Strength | 497 V/mil | 433 V/mil | 404 V/mil | 437 V/mil | |
| | (19.6 kV/mm) | (17.0 kV/mm) | (15.9 kV/mm) | (17.2 kV/mm) | |

*Not classifiable

Although specific embodiments have been illustrated and described herein for purposes of description of preferred embodiments, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. An article comprising:
   a non-cellulosic nonwoven fabric layer having first and second opposing major surfaces and having a non-cellulosic nonwoven paper layer attached to each major surface of the nonwoven fabric layer,
   wherein one or both of the nonwoven paper and nonwoven fabric are electrically insulating,
   wherein the nonwoven fabric layer comprises para-aramid staple fibers having a length of greater than or equal to one inch and binder fibers that soften and flow to bond with the staple fibers and wherein the nonwoven fabric layer has a basis weight of less than 30 g/m$^2$, wherein at least one of the nonwoven paper layers is directly fused to the nonwoven fabric layer by the binder fibers in the nonwoven fabric, and wherein when the thickness of the article is between about 5 mil and about 20 mil, the tensile strength in the machine direction of the article is greater than about 60 pounds per inch width.

2. The article of claim 1 comprising multiple alternating layers of nonwoven paper and nonwoven fabric, wherein both exterior layers are nonwoven paper.

3. The article of claim 2 comprising five alternating layers.

4. The article of claim 1 wherein the nonwoven fabric layer comprises more than one sheet of nonwoven fabric.

5. The article of claim 2 wherein at least one nonwoven fabric layer comprises more than one sheet of nonwoven fabric.

6. The article of claim 4 wherein the sheets comprising at least one of the nonwoven fabric layers have different properties.

7. The article of claim 6 wherein the different properties are selected from the group consisting of thickness, composition, density, flexibility, tear strength, tensile strength, dielectric strength, and flame resistance.

8. The article of claim 1 having a composite part dielectric breakdown strength of greater than or equal to 150 volts/mil according to ASTM D149-09.

9. The article of claim 1 wherein the article achieves a UL 94 flame resistance test rating of V-0.

10. The article of claim 1 comprising about 3 to about 50 wt % nonwoven fabric layer and about 50 to about 97 wt % nonwoven paper layer(s).

* * * * *